United States Patent
Aussermeier

(10) Patent No.: US 8,741,080 B2
(45) Date of Patent: Jun. 3, 2014

(54) METHOD FOR PRODUCING INNER CLADDING PARTS BY LAMINATION, AND INNER CLADDING PART

(75) Inventor: Josef Aussermeier, Neumarkt-Sankt Veit (DE)

(73) Assignee: Lisa Dräxlmaier GmbH, Vilsbiburg (DE)

( * ) Notice: Subject to any disclaimer, the term of this patent is extended or adjusted under 35 U.S.C. 154(b) by 0 days.

(21) Appl. No.: 13/635,804

(22) PCT Filed: Mar. 15, 2011

(86) PCT No.: PCT/EP2011/053845
§ 371 (c)(1),
(2), (4) Date: Nov. 30, 2012

(87) PCT Pub. No.: WO2011/120794
PCT Pub. Date: Oct. 6, 2011

(65) Prior Publication Data
US 2013/0062902 A1    Mar. 14, 2013

(30) Foreign Application Priority Data
Mar. 30, 2010    (DE) .......................... 10 2010 003 440

(51) Int. Cl.
*B29C 65/00* (2006.01)
(52) U.S. Cl.
USPC .......................................... 156/60; 296/39.1
(58) Field of Classification Search
USPC ..................... 296/39.1; 156/60, 196
See application file for complete search history.

(56) References Cited

U.S. PATENT DOCUMENTS

| 2,407,833 | A | 9/1946 | Jablonsky |
| 7,223,087 | B2 * | 5/2007 | Akopyan ..................... 425/174 |
| 2010/0021737 | A1 | 1/2010 | Beck et al. |
| 2010/0038025 | A1 | 2/2010 | Keite-Telgen-Buescher et al. |
| 2013/0056147 | A1 | 3/2013 | Aussermeier |

FOREIGN PATENT DOCUMENTS

| DE | 41 12 607 A1 | 10/1992 |
| DE | 198 46 402 A1 | 4/2000 |
| DE | 697 00 507 T2 | 4/2000 |
| DE | 101 06 888 A1 | 9/2002 |
| DE | 102 35 831 A1 | 2/2004 |

(Continued)

OTHER PUBLICATIONS

International Search Report and Written Opinion for International Application No. PCT/EP2011/053845, dated Jul. 4, 2011 (10 pages).

(Continued)

*Primary Examiner* — Lori Lyjak
(74) *Attorney, Agent, or Firm* — Wolf, Greenfield & Sacks, P.C.

(57) ABSTRACT

A method is provided for producing an inner cladding part for vehicles by lamination of a first, preferably flexible material layer, having an upper side and an underside, onto a preferably dimensionally stable carrier, having a preferably three-dimensional surface contour of the carrier, with a thermally activatable adhesive applied to the underside of the material layer and/or the surface contour of the carrier. Carbon nanotubes, forming a heating device, are in contact with the adhesive at least in one sub-region. The method includes heating the adhesive in the sub-region by applying a voltage to the carbon nanotubes, as a result of which the adhesive is activated, and compressing the material layer and the carrier.

11 Claims, 1 Drawing Sheet

(56) References Cited

FOREIGN PATENT DOCUMENTS

| | | |
|---|---|---|
| DE | 10 2006 055 474 A1 | 6/2007 |
| DE | 10 2007 007617 A1 | 8/2008 |
| EP | 0 796 719 B1 | 9/1999 |
| EP | 1 138 470 A2 | 10/2001 |
| EP | 1 280 867 B1 | 12/2004 |
| WO | WO 01/85862 A1 | 11/2001 |
| WO | WO 2008/043812 A2 | 4/2008 |

OTHER PUBLICATIONS

International Preliminary Report on Patentability for International Application No. PCT/EP2011/053845, dated Oct. 11, 2012 (9 pages).

* cited by examiner

METHOD FOR PRODUCING INNER CLADDING PARTS BY LAMINATION, AND INNER CLADDING PART

RELATED CASE INFORMATION

This application is a 371 U.S. National Stage Application of International Application No. PCT/EP2011/053845, filed on Mar. 15, 2011, claiming priority to German application no. DE 10 2010 003 440.1, filed on Mar. 30, 2010, the entire disclosures of which are incorporated herein by reference.

The present invention relates to a method for producing components that can be used in the interior of land vehicles, watercraft and aircraft, and in particular components for the interior of motor vehicles. These include, purely by way of example, cladding parts in the region of the doors, instrument panels, glove compartments and center consoles. In particular, the present invention relates to a method for producing the components by laminating a preferably flexible material layer, having an upper side and an underside, onto a preferably dimensionally stable carrier, having a preferably three-dimensional surface contour, and to such components.

In the prior art, for the production of carriers laminated with a flexible material layer, a distinction is made primarily between so-called vacuum laminating (also termed film laminating) and so-called press laminating.

In the case of vacuum laminating, normally, plastic films, as a flexible material layer, are laminated onto carriers by application of vacuum. An adhesive applied to the carrier and/or to the flexible material layer is used for connecting between the carrier and the flexible material layer.

Press laminating is normally used in the processing of flexible material layers that either cannot be subjected to vacuum, such as, for example, textiles, or that cannot be stretched, or that can be stretched only to a certain extent, such as, for example, leather or synthetic leather. In this case, the carrier and the flexible material layer that are inserted in the mold are pressed together, or joined, in a predefined press nip. In the case of this method, likewise, the elements are connected by means of adhesive applied to the carrier and/or to the flexible material layer.

In many cases, a thermally activatable adhesive that has previously been applied to one or both of the elements is used to connect the two elements. This adhesive must be activated before or during the laminating operation.

This can be effected by heating the laminating dies, or their mold halves, such that the adhesive in the joint between the carrier and the flexible material layer is activated as a result of the carrier and the flexible material being in contact with the heated mold. The heating in this case is effected by simultaneous heating of the carrier and the flexible material layer. However, it must be taken into account, particularly if sensitive materials are used, that arbitrarily high temperatures cannot be applied via the mold halves.

Alternatively, it is known practice to heat the adhesive layer before the carrier and the flexible material layer are brought together, e.g. by means of hot air or infrared.

Further, owing to a low initial adhesion between the elements, it might be necessary for the joint temperature in the joint between the flexible material layer and the carrier to be rapidly reduced again by cooling one or both dies.

The above-mentioned methods have the disadvantage of a high expenditure of energy, since the dimensionally stable carrier and the flexible material layer undergo concomitant heating as the adhesive is being activated. Further, the methods result in relatively long cycle times, since the heat on the upper side of the flexible material layer may not be more than 85° C., particularly if real leather is used. Moreover, in the case of a number of methods, the adhesive joint has to be cooled again in order to prevent separations.

Accordingly, the object of the present invention consists in creating a method, of the type stated at the outset, that can be executed in a manner that is reliable in respect of the process, but with shorter cycle times and a lesser expenditure of energy. A further object of the present invention consists in creating an inner cladding part for vehicles that can be produced in a manner that is reliable in respect of the process, but with shorter cycle times and a lesser expenditure of energy.

The above object is achieved by a method having the features of claim 1, and by an inner cladding part having the features of claim 6. Alternatively, the present invention can also be implemented in a method as claimed in claim 11.

The present invention is based on the concept of activating the adhesive directly in the joint between the dimensionally stable carrier and the flexible material layer, i.e. between the surface contour of the dimensionally stable carrier and the underside of the flexible material layer. Owing to the direct application of the heat into the joint, the energy to be expended can be used very efficiently, since only the adhesive is heated directly, and the dimensionally stable carrier and the flexible material layer do not undergo concomitant heating as in the case of current methods. In addition, very short cycle times can be realized, in that carbon nanotubes that have a very direct response characteristic are used as a heating means.

Accordingly, the present invention proposes a method for producing an inner cladding part for vehicles by laminating a preferably flexible material layer onto a preferably dimensionally stable carrier. The flexible material layer has an upper side and an underside. The two sides can be of the same design. Alternatively, the flexible material layer can have a right side and a wrong side, the right side being the upper side and the wrong side being the underside. The latter applies particularly in the case of laminating decorative materials onto a dimensionally stable carrier, the upper side of the decorative materials constituting, in the subsequent component, a viewing side that a viewer can see in the end product, e.g. the fitted cladding part in the motor vehicle. The dimensionally stable carrier is usually made of plastic, in particular injection molded plastic. It can have a three-dimensional surface contour. This means that its surface, which subsequently carries the flexible material layer, does not lie in one plane, but is a three-dimensionally curved surface. The flexible material layer can be a decorative layer composed of, for example, leather, real leather, synthetic leather, non-transparent plastic films, textiles, nonwoven fabrics, knit fabrics, wood veneers or a stone layer. The flexible material layer can also be an intermediate layer, e.g. a haptic layer in the form of a spacing layer, e.g. a knitted spacing fabric. It is understood, however, that the present invention is also applicable to the connection of any elements to each other, e.g. two flexible material layers or two dimensionally stable materials. Moreover, the finished inner cladding part need not have a three-dimensional surface contour, but can also be designed so as to lie flat, or in a planar manner, in one plane. The method comprises the steps of supplying the dimensionally stable carrier, and placing the underside of the flexible material layer onto the surface contour of the dimensionally stable carrier. Beforehand, in a separate method step, a thermally activatable adhesive is applied on the underside of the flexible material layer and/or on the surface contour of the dimensionally stable carrier. Any known methods such as, for example, spray application, can be used for this purpose. The thermally activatable adhesive can be a hot-melt or a thermally activatable dispersion adhesive. For the purpose of activating the adhesive, the present invention proposes, as a heating means, the use of carbon nanotubes, which are in contact with the adhesive at least in a sub-region. For this purpose, to enable a voltage to be applied, it is necessary to effect electrical contacting of the heating area constituted by the carbon nanotubes. Application of the voltage results in heating of the carbon nanotubes, which act as an ohmic resistance of the heating means and heat the adhesive in the sub-region, as a result of which the adhesive is activated. The electrical contacting can be realized, if appropriate, by inserted copper strips (copper foil) or contact tongs, which engage in peripheral regions of the dimensionally stable carrier.

Furthermore, the method according to the invention comprises the pressing together of the flexible material layer and the dimensionally stable carrier. This can be effected after and/or during the activation of the adhesive. Preferably, however, the pressing together is effected before the activation, such that the flexible material layer and the carrier are already fixed exactly in position, without still being able to move relative to each other. The design according to the invention creates a method that can be executed in a manner that is reliable in respect of the process, with short cycle times.

A further advantage of the use of carbon nanotubes consists in that a voltage in a relatively low range is sufficient for activation with short cycle times. Such low voltages are advantageous in respect of workplace safety, and do not require any special safety preparations.

In the case of the present invention, the adhesive may be heated and activated in the entire region of the surface contour of the dimensionally stable carrier through application of the voltage to the carbon nanotubes, in order to fasten the flexible material layer to the surface contour. In this case, "in the entire region" is to be understood to mean that the adhesive is heated at least in the entire region in which a connection is to be produced, in one work operation, between a dimensionally stable carrier and a flexible material layer. Peripheral regions at the periphery of the carrier cannot be excluded here.

Alternatively, the method according to the invention can also be used for prefixing the flexible material layer to the dimensionally stable carrier. Particularly in the case of use of flexible material layers in the form of a sewn covering, in which the flexible material layer consists of at least two parts connected to each other along a seam, it is advantageous to activate only the region of the adhesive in which the seam is prefixed. In other words, according to a preferred embodiment, in this case, at least initially only the adhesive in the region of the surface contour of the dimensionally stable carrier is activated, in that the seam of the flexible material layer has to be placed, i.e. prefixed. The activation of the sub-region can be effected through a controlled application of the voltage in the individual sub-regions, e.g. at the two ends along the portion on the dimensionally stable carrier that corresponds to the course of the seam. This controlled application can also be realized through corresponding provision of contact strips or attachment of contact tongs. The remaining adhesive can subsequently be activated in a different manner, or alternatively, preferably, it can be activated in the same manner, the voltage being applied, not only to the sub-region, but over the entire region of the surface contour, as explained above.

In order that no additional method step is required to bring the carbon nanotubes into contact with the adhesive, it may be preferred to dissolve or disperse the carbon nanotubes in the adhesive before the latter is applied to the surface contour of the dimensionally stable carrier and/or to the underside of the flexible material layer. Consequently, in the case of this embodiment, no additional layer is required, as compared with the previous component, and it is possible to dispense with additional method steps.

Alternatively, however, it is also conceivable for the carbon nanotubes to be applied separately from the adhesive, and before the adhesive is applied to the surface contour of the dimensionally stable carrier and/or to the underside of the flexible material layer. This can be effected, purely by way of example, by a coating. For example, from the firm Future-Carbon GmbH, Germany, there is a known acrylate-based heating coating, called Carbo e-Therm LT, which is suitable for this purpose.

Furthermore, the present invention also proposes an inner cladding part for vehicles that can be produced, or is produced, by the above-mentioned method.

What has developed particularly advantageously from this is the dual function of the heating means, composed of carbon nanotubes. In the produced inner cladding part, these carbon nanotubes can serve as an ohmic resistance of a panel heating system. If the inner cladding part is used, for example, in the region of the instrument panel, center console or door inner cladding or, alternatively, in the region of the headliner, it is possible to create sufficient areas for a panel heating system in a motor vehicle, such that the heating means, composed of carbon nanotubes, that is used in the laminating method also has a further use in the subsequent inner cladding part. This means that the present invention also relates to the use of the heating means, composed of carbon nanotubes, in an inner cladding part for vehicles that has been produced by the method as described above, as an ohmic resistance of a panel heating system.

Alternatively, it is also conceivable for the carbon nanotubes to be used as a current source of a functional element or of an external electrical/electronic device. Thus, in the case of contacting of the area constituted by the carbon nanotubes, current can be tapped at two points spaced apart from each other. The potential in this case results from the distance between the two points at which the voltage is tapped. In order to supply current to the functional element, the latter can be contacted to the area composed of carbon nanotubes, e.g. by corresponding contact elements, e.g. pins in the form of needle tips, through the flexible material layer. Alternatively, it is also conceivable for a current supply interface to be fixedly connected to the inner cladding part, which current supply interface is connected, at the two above-mentioned points for tapping the voltage, to the layer composed of carbon nanotubes. This current supply interface can be, for example, a socket connector or a plug connector for connecting to an external electrical/electronic device, e.g. an MP3 player, a navigation device, a mobile telephone, etc. For example, a USB connector slot or a USB connector is used. Other forms of plug connector or socket connector are also conceivable, however.

Moreover, it is also conceivable for possible lighting elements or means, which can be integrated as decorative elements into inner cladding parts, to be supplied with electric current via the area composed of carbon nanotubes. Thus, for example, LEDs could be supplied with current by contacting the LED contacts, at a distance from one another, to the area composed of carbon nanotubes.

In the case of all of these embodiments, the present invention makes use of the fact that the voltage to be applied to the surface composed of carbon nanotubes lies within the range of the on-board power supply voltage of a motor vehicle, from 0-12 V, such that contacting of the carbon nanotubes to the on-board power supply can be realized without difficulty.

The present invention has been described above in connection with the heating of a thermally activatable adhesive directly in the joint between the components to be connected, but, alternatively, it can also be implemented in a method in which the carbon nanotubes are applied, as a heating means, to an inner contour of a laminating mold, which inner contour comes into contact with the upper side of the flexible material layer as the flexible material layer and the dimensionally stable carrier are pressed together, the heating of the adhesive being effected through application of a voltage to the carbon nanotubes, in this case via the flexible material layer. This has the advantage, as compared with the prior art, that the mold does not have to be designed with complicated channels, and is therefore inexpensive. Further, the mold halves can be cooled immediately after the heating temperature has been attained, in order for cycle times to be kept short in this embodiment also.

Further features and advantages of the present invention, which can be implemented singly or in combination with one or more of the above-mentioned features, insofar as the features are not at variance with each other, are disclosed by the following description of a preferred embodiment. This description is given with reference to the accompanying drawings, wherein.

Figure 1:
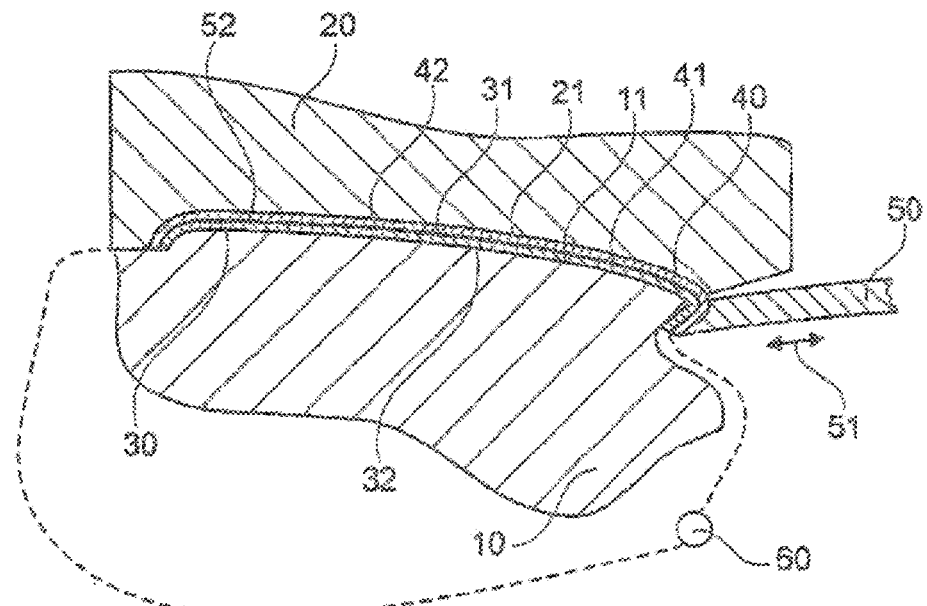
FIG. 1 shows a schematic partial section of a press laminating mold.

Represented in FIG. 1 is a press laminating mold, which can be used to execute the method according to the present invention. The press laminating mold represented comprises a bottom die 10, which is the lower mold half, and a top die 20, which is the upper mold half.

The bottom die 10 can be a mold half made of, for example, aluminum. The lower mold half 10 is designed to receive a dimensionally stable carrier 30. If necessary, the bottom die 10 can be cooled, but is unheated.

The top die 20 is constituted by a mold shell, which comprises a shaping inner contour 21. A defined press nip is constituted between the inner contour 21 and an upper surface, or upper side 11, of the bottom die 10, on which the back side of the carrier 30 lies. Cooling channels can also be realized in the mold shell of the top die 20. The top die 20, or its mold shell, is also unheated.

Also provided is a fold slide 50, which can be moved in the direction of the double arrow 51 and by which, if necessary, a part of the flexible material layer 40, which initially projects over the edge of the dimensionally stable carrier 30, can be pressed onto the latter in a folding region.

The dimensionally stable carrier 30 is preferably a plastic carrier, and is preferably injection molded. It has a surface 31. This surface 31 is, for example, curved three-dimensionally, such that a three-dimensional surface contour is constituted. The side 32 that is opposite the surface contour 31 is located on the upper side 11 of the bottom die 10. Further, the dimensionally stable carrier 30 is fixed in position on the bottom die 10.

The flexible material layer 40, which, in the case of the embodiment represented, is a decorative layer, preferably of real leather or synthetic leather, lies with its underside 41, or back side, on the upper surface contour 31 of the carrier 30. The upper side 42 faces toward the inner contour 21 of the mold shell of the top die 20.

A thermally activatable adhesive 52 is provided in the joint between the surface contour 31 and the underside 41. This adhesive can be applied beforehand to the back side, or underside 41, of the flexible material layer 40 and/or to the upper side 31, or surface contour 31, of the dimensionally stable carrier. Conventional application methods such as, for example, a spraying method, can be used in this case. The adhesive can be a hot-melt or a thermally activatable adhesive. The activation temperature can be in a range between 50° C. and 200° C. In the case of a hot-melt of the aforementioned type, the activation temperature is preferably 70° C. In the case of a dispersion adhesive of the aforementioned type, it is preferably approximately 55° C.

According to one embodiment of the present invention, a layer, comprising interconnected carbon nanotubes, which produce a sheet structure, is provided between the adhesive layer 52 and the surface contour 31 of the carrier 30 and/or between the adhesive layer 52 and the underside 41 of the flexible material layer 40. The layer of carbon nanotubes, which is not represented in FIG. 1, can be contacted to a current source 60 via appropriate contacting means, e.g. contact strips (e.g. copper strips).

According to one embodiment, the contacting in this case is effected at two opposite ends of the sheet structure (in FIG. 1, for example, at the left and right, or at front and back). If heating is to be effected in the entire region of the sheet structure composed of carbon nanotubes, the contacting is effected at the respectively opposite ends along the entire width, at the respective ends that are parallel to each other (perpendicular to the direction of the page in FIG. 1, or from left to right in the width). If only a sub-region is to be heated, the respective sub-region is defined by the respectively two contacting points, and by their depth, or width. This is explained in greater detail below with reference to FIG. 3.

When a voltage, for example of 12 V, or possibly even higher, is applied via the current source 60, in order for the desired temperature, or higher temperatures, to be achieved more rapidly, the carbon nanotubes connected to each other in an electrically conducting manner act as an ohmic resistance, and cause the sheet structure to become heated. The sheet structure in this case is in contact with the adhesive layer 52, such that the adhesive becomes heated to the desired activation temperature. The heat in this case is applied directly in the joint in which the adhesive layer 52 is present, between the upper side 31 of the carrier 30 and the underside 41 of the material layer 40. As soon as the activation temperature has been attained, the voltage can be deactivated and, if necessary, the bottom die 10 and/or the top die 20 can be cooled.

According to an alternative embodiment, it is preferred to dissolve or disperse the carbon nanotubes in the adhesive layer 52 in such a way that there is no need for additional coating with the carbon nanotubes. Otherwise, the design is the same as that described above. The latter embodiment is represented in FIG. 1.

A method according to an embodiment of the present invention is explained in the following with reference to FIG. 1.

In a first method step, the surface 31 of the carrier 30 and/or the underside 41 of the material layer 40 are provided with a coating of carbon nanotubes, and then with an application of adhesive in the form of a thermally activatable adhesive. Alternatively, and if the carbon nanotubes are already dissolved or dispersed in the adhesive, merely such an application of adhesive is sufficient. The material layer 40 is then prefixed on the carrier 30. The carrier 30 is thereupon fixedly placed in the bottom die 10. The top die 20 then closes, such that the press nip provided between the bottom die 10 and the top die 20 is realized. During or after closing, a voltage 60 is applied to the sheet structure composed of carbon nanotubes, as a result of which the latter act as an ohmic resistance and constitute a heating means. As a result, the thermally activatable adhesive 52, in which the carbon nanotubes are dispersed or dissolved, or with which the sheet structure composed of carbon nanotubes is in direct, immediate contact, is brought to the activation temperature, as mentioned above. As soon as the activation temperature has been attained, the current source 60 can be deactivated and, if necessary, the mold halves 10 and/or 20 can be cooled, in order to achieve rapid cooling of the joint temperature. At the same time, the fold slide 50, by moving in the direction toward the left in FIG. 1, can press the part of the flexible material layer 40 that is projecting over an edge of the carrier 30 against the carrier 30, or its upper side 31. There is no need in this case for additional heating of the adhesive in this region, since this can likewise be achieved by means of the heating means comprising the carbon nanotubes, provided that an appropriate contacting can be realized. Then, and after the mold halves 10 and 20 have been opened, the produced component can be removed.

The contact strips that project over the component can then be removed. On the other hand, it is preferred to retain the contact strips and, following installation in a vehicle, to effect contacting to the 12 V on-board power supply. It thereby becomes possible for the sheet structure composed of carbon nanotubes, which is either applied separately from the adhesive 52 or is dissolved or dispersed in the latter, to be used also in the finished component. For example, a panel heating system could be created by application of a voltage to the contact strips in the finished component. Particularly in the case of use in large-area interior components such as, for example, the instrument panel and/or door claddings, and in the headliner, it is thereby possible to heat large areas, which might possibly replace a conventional heating system in a motor vehicle. In the case of smaller areas also, e.g. steering wheels, arm rests, etc., it is possibly advantageous to heat these areas, so as to impart a pleasant sensation of warmth to the user. Owing to the chemical reaction effected in the adhesive, there is no possibility of subsequently dissolving the adhesive bond by reheating.

It is understood that, if appropriate, more than just two layers could be connected to each other by means of this method, e.g. a further, intermediate layer, in the form of a haptic layer, e.g. a spacing layer, can be provided between the material layer 40 and the carrier 30. Knit spacing fabrics, nonwoven fabrics and similar layers are possibilities here. It is also conceivable that the material layer 40 already consists of two or more layers. Purely by way of example, reference may be made here to leather sheet fabrics, in which a layer of synthetic leather is provided with a reinforcing layer on the back side. The reinforcing layer in this case can preferably consist of a nonwoven fabric layer.

As an alternative application of the sheet structure composed of carbon nanotubes, it is also conceivable to provide a current supply for an external device. Thus, it is conceivable for the material layer 40 to be realized as a decorative layer, which can be reversibly penetrated by contact pins. The contact pins, which should be designed so as to be electrically conducting, come into contact with the sheet structure composed of carbon nanotubes, or are electrically connected to it, at a distance from each other that defines the corresponding voltage potential. If current is supplied to this sheet structure, i.e. if a voltage is applied, current is supplied via the two pins. This current supply can be effected for the purpose of supplying current to electrical devices via, for example, a plug connector (USB, etc.) or directly, by "docking" the device, which, in this case, must have the corresponding contact pins. Purely by way of example, navigation systems, mobile telephones, MP3 players, etc. may be mentioned as such external devices.

Alternatively, it is also conceivable for lighting elements to be integrated into the inner cladding part, which lighting elements can be supplied with current by bringing them into contact, at two points, with the sheet structure composed of carbon nanotubes, and connecting the contact strips to the on-board power supply. Purely by way of example, reference may be made here to LEDs, which can be used in combination with fiber-optic conductors.

Figure 2:
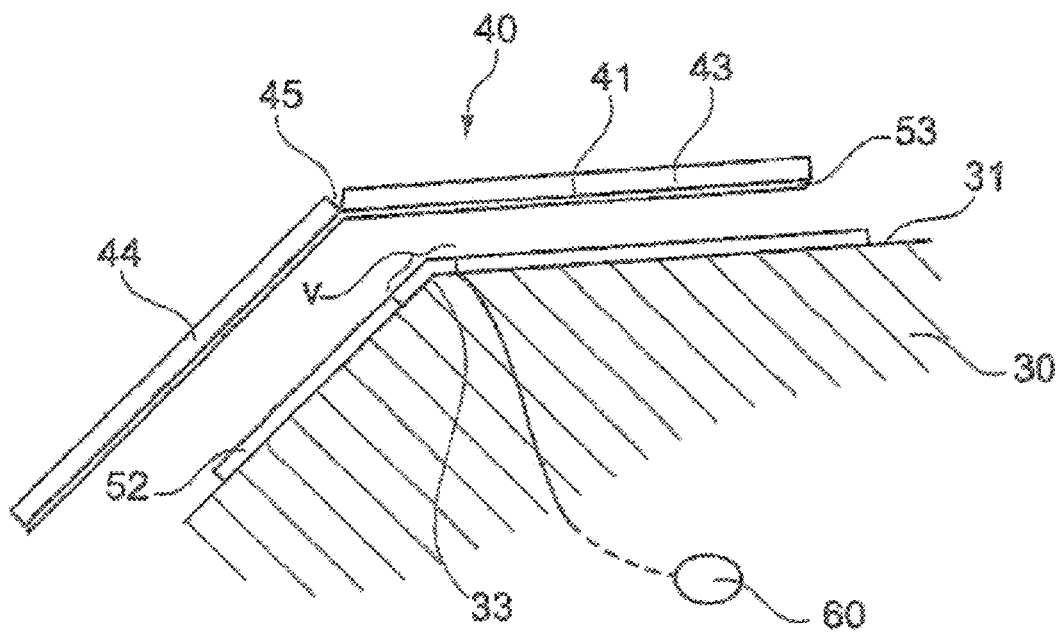
FIG. 2 shows a partial section of an inner cladding part according to the invention, in an exploded representation.

According to an alternative embodiment, the present invention can also be used to prefix the flexible material layer 40 on the dimensionally stable carrier 30. This is advantageous, in particular, if the surface contour 31 of the dimensionally stable carrier 30 is highly curved and the flexible material layer 40 is in the form of a sewn covering, in which a first part 43 and a second part 44 are connected to each other along a seam 45 (FIG. 2).

For this purpose, during prefixing, the seam 45 must be fixed as accurately as possible on the angled bend 33 of the carrier 30, i.e. on the contour discontinuity. According to this embodiment, an adhesive layer 52, of a thermally activatable adhesive, is applied, as mentioned above, on the surface contour 32 of the carrier. A sheet structure of carbon nanotubes, e.g. the above-mentioned coating, can be applied between this adhesive layer and the surface contour 31.

Alternatively, it is also conceivable, as explained above, for the carbon nanotubes to be dissolved or dispersed in the adhesive 52 itself. Further, a thermally activatable adhesive 53 is likewise provided on the underside 41 of the material layer 40. This adhesive might also be omitted. For the purpose of prefixing, a contacting of the carbon nanotubes (here, the adhesive layer 52 with the carbon nanotubes) is applied, along a width V, at two ends that are spaced apart from each other. The two contacting points placed at spaced-apart ends lie along the contour discontinuity 33 (perpendicularly in FIG. 2). As a result of application of a voltage in only this sub-region, as has been indicated by the hatching in FIG. 2, the adhesive is activated only in this sub-region, such that the layer 40 can be prefixed manually in this region.

The inner cladding part can then be produced by a conventional press laminating method, or alternatively, preferably, the adhesive can be activated along the entire surface contour 31 by means of the carbon nanotubes, as explained with reference to FIG. 1.

It is understood that the description of the embodiments in FIGS. 1 and 2 is purely exemplary, and that various kinds of variations and modifications are evident to persons skilled in the art. For example, it would also be conceivable for a coating composed of carbon nanotubes to be applied on the inner contour 21 of the top die 20, and for the heating of the adhesive layer 52 in the joint between the material layer 40 and the carrier 30 to be provided via the top die 20, or the coating composed of carbon nanotubes. In this case, however, it would be necessary to effect heating through the material layer 40, which might be less preferable. It is also understood that the sheet structure composed of carbon nanotubes need not necessarily continue to be used in the subsequent component, if this also offers advantages. The present invention is also not limited to the use of the carbon nanotube layer as a panel heating system or energy source in the finished component. Other applications are also conceivable.

Finally, the present invention has been described above on the basis of a press laminating method, but it can also undoubtedly be implemented in the case of a vacuum laminating method. Also conceivable, furthermore, are other laminating methods in which two or more elements are to be connected, preferably flatly, to each other. From this, it already ensues that the elements to be connected to each other need not necessarily be dimensionally stable and flexible. Rather, two dimensionally stable elements or two flexible elements can also be connected.

The invention claimed is:

1. A method for producing an inner cladding part for vehicles by laminating a flexible material layer, having an upper side and an underside, onto a dimensionally stable carrier, having a three-dimensional surface contour, the method comprising:

supplying the carrier;

placing the underside of the material layer onto the surface contour of the carrier, wherein a thermally activatable adhesive has been applied on the underside of the material layer and/or on the surface contour of the carrier, wherein carbon nanotubes are in contact with the adhesive at least in a sub-region;

heating the adhesive in the sub-region through application of a voltage to the carbon nanotubes to thereby activate the adhesive; and pressing together the material layer and the carrier.

2. The method as claimed in claim 1, wherein the material layer includes at least two parts connected to each other along a seam, and the sub-region, at least initially, is only the region of the surface contour of the carrier in which the seam is placed.

3. The method as claimed in claim 1, wherein the adhesive is heated and activated substantially in the entire region of the surface contour of the carrier through application of the voltage to the carbon nanotubes.

4. The method as claimed in claim 1, wherein the carbon nanotubes are dissolved or dispersed in the adhesive.

5. The method as claimed in claim 1, wherein the carbon nanotubes are applied separately from the adhesive, and before the adhesive is applied to the surface contour of the dimensionally stable carrier and/or to the underside of the flexible material layer.

6. An inner cladding part for vehicles produced by the method as claimed in claim 1.

7. The inner cladding part as claimed in claim 6, wherein the carbon nanotubes serve as an ohmic resistance of a panel heating system.

8. The inner cladding part as claimed in claim 6, wherein the carbon nanotubes serve as a current source of a functional element or of an external electronic device.

9. The inner cladding part for vehicles as claimed in claim 8, wherein the functional element is a current supply interface for supplying current to an external electronic device.

10. The inner cladding part for vehicles as claimed in claim 8, wherein the functional element is a lighting element.

11. A method for producing an inner cladding part for vehicles by laminating a flexible material layer, having an upper side and an underside, onto a dimensionally stable carrier, having a three-dimensional surface contour, the method comprising:

supplying the carrier;

placing the underside of the material layer onto the surface contour of the carrier, wherein a thermally activatable adhesive has been applied on the underside of the material layer and/or on the surface contour of the carrier, wherein carbon nanotubes are applied to an inner contour of a laminating mold, wherein the inner contour comes into contact with the upper side of the material layer as the material layer and the carrier are pressed together;

heating the adhesive in the sub-region through application of a voltage to the carbon nanotubes to thereby activate the adhesive; and pressing together the material layer and the carrier.

* * * * *